US011733251B2

(12) United States Patent
Sarich et al.

(10) Patent No.: US 11,733,251 B2
(45) Date of Patent: Aug. 22, 2023

(54) METHODS AND SYSTEMS OF PERFORMING AN ASSAY

(71) Applicant: AMGEN INC., Thousand Oaks, CA (US)

(72) Inventors: Brandon Zachary Sarich, Thousand Oaks, CA (US); Michael R. Berke, Newbury Park, CA (US); Chuck Z. Li, Thousand Oaks, CA (US); Thomas Clark Pearson, Newbury Park, CA (US)

(73) Assignee: AMGEN INC., Thousand Oaks, CA (US)

( * ) Notice: Subject to any disclaimer, the term of this patent is extended or adjusted under 35 U.S.C. 154(b) by 246 days.

(21) Appl. No.: 16/741,808

(22) Filed: Jan. 14, 2020

(65) Prior Publication Data

US 2020/0249248 A1 Aug. 6, 2020

Related U.S. Application Data

(60) Provisional application No. 62/801,025, filed on Feb. 4, 2019, provisional application No. 62/800,372, filed on Feb. 1, 2019.

(51) Int. Cl.
*G01N 35/00* (2006.01)
*G01N 35/10* (2006.01)

(52) U.S. Cl.
CPC .  *G01N 35/00029* (2013.01); *G01N 35/00693* (2013.01); *G01N 35/1002* (2013.01);
(Continued)

(58) Field of Classification Search
None
See application file for complete search history.

(56) References Cited

U.S. PATENT DOCUMENTS 6,558,623 B1    5/2003  Ganz et al.
2004/0197926 A1  10/2004 Schuerf et al.
(Continued)

FOREIGN PATENT DOCUMENTS

JP    2007-228863 A    9/2007

OTHER PUBLICATIONS

Machine-generated English translation of JP 2007-228863 to Mishima, pp. 1-15 (Year: 2007).*

(Continued)

*Primary Examiner* — P. Kathryn Wright
(74) *Attorney, Agent, or Firm* — Marshall, Gerstein & Borun LLP

(57) ABSTRACT

Methods and systems of performing an assay. A system for performing an assay includes an enclosure defining a temperature-controlled space. An imaging system, an actuator and a dispenser are disposed within the space. The actuator receives a well plate having wells. The actuator is to move the well plate relative to the imaging system to enable the imaging system to obtain image data of one of the wells. The dispenser includes a pump, an outlet and a reservoir holder to receive a reservoir containing a compound. The pump is to be fluidly coupled to the reservoir and an outlet. The pump is to pump the compound from the reservoir through the outlet into one of the wells. The system also includes a controller. The controller is to cause the dispenser to dispense the compound into the first one of the wells while the imaging system obtains the image data.

10 Claims, 10 Drawing Sheets

(52) U.S. Cl.
CPC .............. *G01N 2035/00306* (2013.01); *G01N 2035/00346* (2013.01); *G01N 2035/1027* (2013.01)

(56) References Cited

U.S. PATENT DOCUMENTS

| | | |
|---|---|---|
| 2006/0275847 A1 | 12/2006 | Goodyer et al. |
| 2014/0296089 A1* | 10/2014 | Holmes .................... B01L 9/06 506/9 |
| 2014/0360286 A1* | 12/2014 | Carragher et al. .... H01J 37/261 73/863.11 |
| 2019/0195807 A1* | 6/2019 | Lansing ................. G01N 21/76 |

OTHER PUBLICATIONS

European Patent Application No. 20154680.1, Extended European Search Report, dated Jul. 3, 2020.
European Patent Application No. 20154680.1, Communication Pursuant to Article 94(3) EPC, dated Dec. 23, 2021.
European Patent Application No. 20154680.1, Communication Pursuant to Article 94(3) EPC, dated Dec. 21, 2022.

* cited by examiner

METHODS AND SYSTEMS OF PERFORMING AN ASSAY

CROSS-REFERENCE TO RELATED APPLICATIONS

Priority is claimed to U.S. Provisional Patent Application No. 62/800,372, filed Feb. 1, 2019, and U.S. Provisional Patent Application No. 62/801,025, filed Feb. 4, 2019, the entire contents of each of which are hereby incorporated herein by reference.

FIELD OF THE DISCLOSURE

The present disclosure relates generally to performing an assay and, more particularly, to methods and systems of performing an assay in a temperature-controlled enclosure.

BACKGROUND

Certain biological assays are beneficially performed in reduced-temperature environments such as between 4 degrees and 10 degrees Celsius. Typically such assays are performed manually in a laboratory, for example, that is maintained at the desired temperature. This manual process can be tedious, time-consuming, costly, and less than optimal for the personnel manually handling the materials and performing the assay.

SUMMARY

One aspect of the present disclosure includes a system for performing an assay. The system includes an enclosure, an imaging system, an actuator, a dispenser, and a controller. The enclosure defines a temperature-controlled space. The imaging system is disposed within the space. The actuator is disposed within the space to receive a well plate having wells. The actuator further is to move the well plate relative to the imaging system to enable the imaging system to obtain image data of one of the wells. The dispenser is disposed within the space, and includes a reservoir holder to receive a reservoir containing a compound, a pump to be fluidly coupled to the reservoir, and an outlet. The pump is to pump the compound from the reservoir through the outlet into one of the wells. In response to the imaging system being positioned to obtain image data of a first one of the wells, the controller is to cause the dispenser to dispense the compound into the first one of the wells while the imaging system obtains the image data.

In some aspects, the outlet comprises a single-well dispensing pipette.

In some aspects, the dispenser further comprises an adjuster to change a relative position of the outlet and the first one of the wells.

In some aspects, the adjuster comprises a manual adjuster.

In some aspects, the reservoir holder carries the pump.

In some aspects, the dispenser further comprises a tab that extends from the reservoir holder, the tab defining an aperture through which the outlet extends to secure the outlet relative to the reservoir holder.

In some aspects, the dispenser further comprises a base, the reservoir holder movably coupled to the base.

In some aspects, the base comprises a rail and the reservoir holder comprises a block that interacts with the rail to linearly guide the reservoir holder relative to the base.

In some aspects, the system further comprises a threaded adjuster that extends through the reservoir holder and includes an end that is driven against a surface of the base to adjust the reservoir holder relative to the base.

In some aspects, the system further comprises a lock nut that surrounds the threaded adjuster, the lock nut to be tightened against the reservoir holder to secure a position of the reservoir holder.

In some aspects, the base comprises a first base portion and a second base portion, the first base portion comprises the rail and the second base portion comprises the surface against which the threaded adjuster is driven, the first base portion comprising a slot through which a fastener extends to couple the first base portion and the second base portion, the slot enabling fore-aft adjustment of the first base portion relative to the second base portion.

In some aspects, the second base portion comprises opposing walls that defines a channel that receives an end of the first base portion to guide the fore-aft movement of the first base portion.

In some aspects, the second base portion comprise a first sub-base portion and a second sub-base portion, the first sub-base portion comprises a radial slot through which a fastener extends to couple the first sub-base portion and the second sub-base portion, the radial slot enabling radial adjustment of the first sub-base portion, the first base portion, and the reservoir holder relative to the second sub-base portion.

In some aspects, the second sub-base portion is coupled to the imaging system via a fastener.

15. The system of claim 1, wherein the space is approximately or less than 4.5 cubic feet.

In some aspects, the imaging system comprises a microscope.

In some aspects, the actuator comprises a motorized XY microscope stage.

Another aspect of the present disclosure relates to a method of performing an assay. The method includes positioning a first one of wells of a well plate adjacent an aperture of an imaging system using an actuator. The method also includes in response to the first one of the wells being positioned adjacent the aperture, causing a dispenser to dispense a compound into the first one of the wells. The method also includes while the dispenser dispenses the compound, obtaining image data of the first one of the wells using the imaging system, wherein the imaging system, the actuator, and the dispenser are disposed in a temperature-controlled enclosure.

In some aspects, after the image data is obtained, the method further includes moving a second one of the wells adjacent the aperture of the imaging system using the actuator; in response to the second one of the wells being positioned adjacent the aperture, causing the dispenser to dispense the compound into the second one of the wells; and while the dispenser dispenses the compound, obtaining second image data of the second one of the wells.

In some aspects, the method further comprises, prior to positioning the first one of the wells adjacent the aperture, calibrating a position of an outlet of the dispenser relative to the first one of the wells.

In some aspects, the method further comprises, prior to positioning the first one of the wells adjacent the aperture, priming a pump of the dispenser.

In some aspects, obtaining image data of the first one of the wells comprises obtaining image data of the first one of the wells using the imaging system without obtaining image data of others of the wells.

DETAILED DESCRIPTION

Although the following text discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

Figure 1:
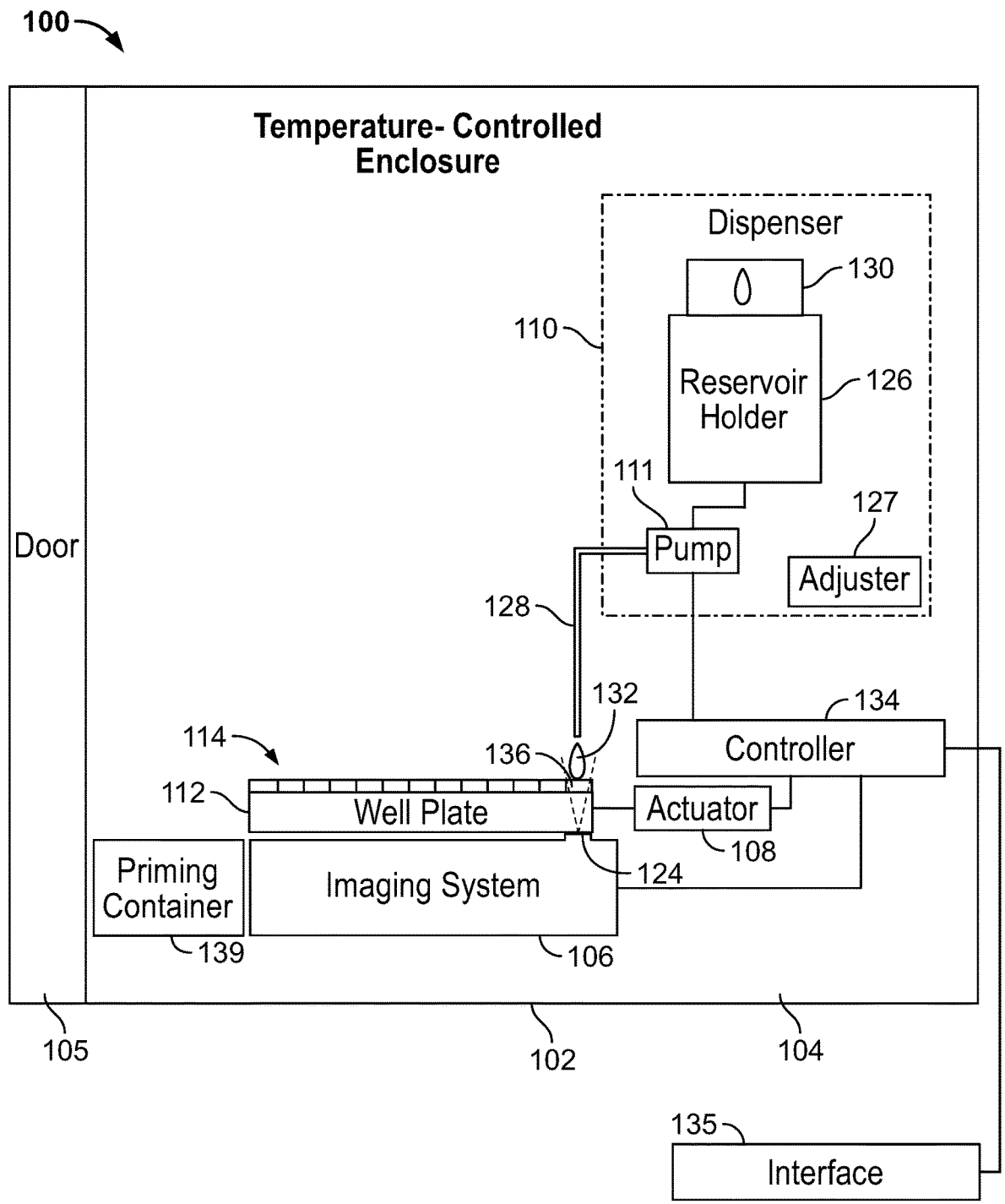
FIG. 1 illustrates an example system for performing an assay in accordance with the teachings of this disclosure.

Referring to FIG. 1, an example system 100 for performing an assay in accordance with a first disclosed example is shown. The system 100 includes an enclosure 102 defining a temperature controlled space 104 that can be sealed via a door 105. The space 104 may be approximately or less than 4.5 cubic feet. However, the size of the space 104 may be different depending on the application.

An imaging system 106, an actuator 108 and a dispenser 110 having a pump 111 are disposed within the space 104. The imaging system 106 can be implemented by a LS720 microscope by Etaluma, the actuator 108 can be implemented by a motorized XY microscope stage by Zaber Technologies and the pump 111 can be implemented by a 12 V, 25 µL solenoid pump by The Lee Company. However, different imaging systems, actuators and/or pumps can be used.

The actuator 108 receives or is otherwise coupled to a well plate 112. The well plate 112 has wells 114. The actuator 108 is arranged to move the well plate 122 relative to the imaging system 106. The imaging system 106 includes an aperture 124 that is sized to obtain image data from one of the wells 114 at a time. Obtaining image data from one of the wells 114 at a time instead of a plurality of the wells 114 at a time increases the quality of the image data obtained.

The dispenser 110 also includes a reservoir holder 126, an adjuster 127 and an outlet 128. The reservoir holder 126 is arranged to carry a reservoir (a container) 130. The reservoir 130 can contain a compound 132 used during the assay.

The pump 111 is fluidly coupled to the reservoir 130 and the outlet 128. The pump 111 is arranged to pump the compound 132 from the reservoir 130 through the outlet 128 into one of the wells 114. The actuator 108 can position one of the wells 114 relative to the outlet 128 such that the outlet 128 is centered relative to the one of the wells 114.

The adjuster 127 can be used to change the relative position of the dispenser 110 and, thus, the outlet 128, relative to a selected one of the wells 114 (e.g., the first well). The adjuster 127 can be a manual adjuster or an adjuster that is implemented by one or more actuators (e.g., linear actuators). The adjuster 127 can move the position of the outlet 128 radially and/or in an x-direction, a y-direction or a z-direction. More generally, the adjuster 127 can adjust the height, the fore-aft position and/or the side-to-side position of the outlet 128.

The system 100 also includes a controller 134, which can include an on-board controller (as shown in FIG. 1) alone or in combination with other controller technology such as a separate computer running dependent on the controller 134 or entirely independent from the controller 134. The controller 134 includes an interface 135. As shown, the interface 135 is operatively coupled to the controller 134 and is positioned outside of the enclosure 102 to enable operator accessibility. The controller 134 can be used to control the imaging system 106 and the dispenser 110. Controlling the imaging system 106 may include causing the imaging system 106 to obtain image data of a kinetic reaction taking place in one of the wells 114. Controlling the dispenser 110 may include initiating a priming procedure of the pump 111.

In practice, prior to beginning the assay, a priming procedure and a calibration procedure can be performed. The priming procedure may be initiated, via the controller 134, by providing a substantially constant high signal (TTL high signal) to the pump 111 in response to an input received at the interface 135. The input may include a button 144 (See, FIG. 4) of the interface 135 being pressed.

The signal received at the pump 111 may cause the pump 111 to continuously pump the compound 132 in designated increments into an empty priming container 139. The designated increments may be 25 microliter (µL) increments. However, the increments may be different depending on the application. After the priming procedure is complete, the pump 111 remains in a resting, non-dispensing state. In the resting, non-dispensing state, the pump 111 is ready to automatically perform the assay on the well plate 112.

The calibration procedure may include using the adjuster 127 to center the outlet 128 relative to a first well 136 of the wells 114. The position of the outlet 128 relative to the first well 136 can be verified by the controller 134 and/or by visual inspection. Centering the outlet 128 relative to the first well 136 may ensure that subsequent movement of the well plate 112, via the actuator 108, results in the outlet 128 being positioned in the center of others of the wells 114.

After the priming procedure and the calibration procedure are complete, the door 105 can be closed and the controller 134 can determine if the first well 136 is positioned such that the imaging system 106 can obtain image data of the first well 136. The controller 134 may determine the position of the first well 136 in response to receiving a signal (a TTL low signal) from the imaging system 106. The signal may be associated with a light of the imaging system 106 turning on.

In response to the signal, the controller 134 may delay for a threshold amount of time and then send a pulse (a signal) to the pump 111 that causes the pump 111 to dispense an amount of the compound 132 into the first well 136. The delay may be 5 seconds or another time period. The pulse may be a 150 microsecond (µs) pulse that causes the pump 111 to dispense 25 µL of the compound 132. However, the pulse may cause a different amount of the compound 132 to be dispensed. After the compound is dispensed, the pump 11 may return to the idle state until the next signal is received at the controller 134 by the imaging system 106.

While the kinetic reaction is occurring within the first well 136, the controller 134 causes the imaging system 106 to obtain image data of the first well 136. The image data (images) may be obtained at a sampling frequency of 10 hertz (Hz) for 20 seconds. However, different sampling frequencies or times can be used.

After the image data is obtained from the first well 136, the controller 134 (or in some versions a separate computer) causes the actuator 108 to move the well plate 112 to position another one of the wells 114 over the aperture 124. Once in position, the light of the imaging system 106 turns on, the signal is provided to the controller 134 by the imaging system 106 and the process is repeated. After the image data is obtained, the controller 134 (or in some versions, a separate computer) causes the actuator 108 to move the well plate 112 to position the next one of the wells 114 adjacent the aperture 124 of the imaging system 106 and the outlet 128 of the dispenser 110 and the process is repeated.

Figure 2:
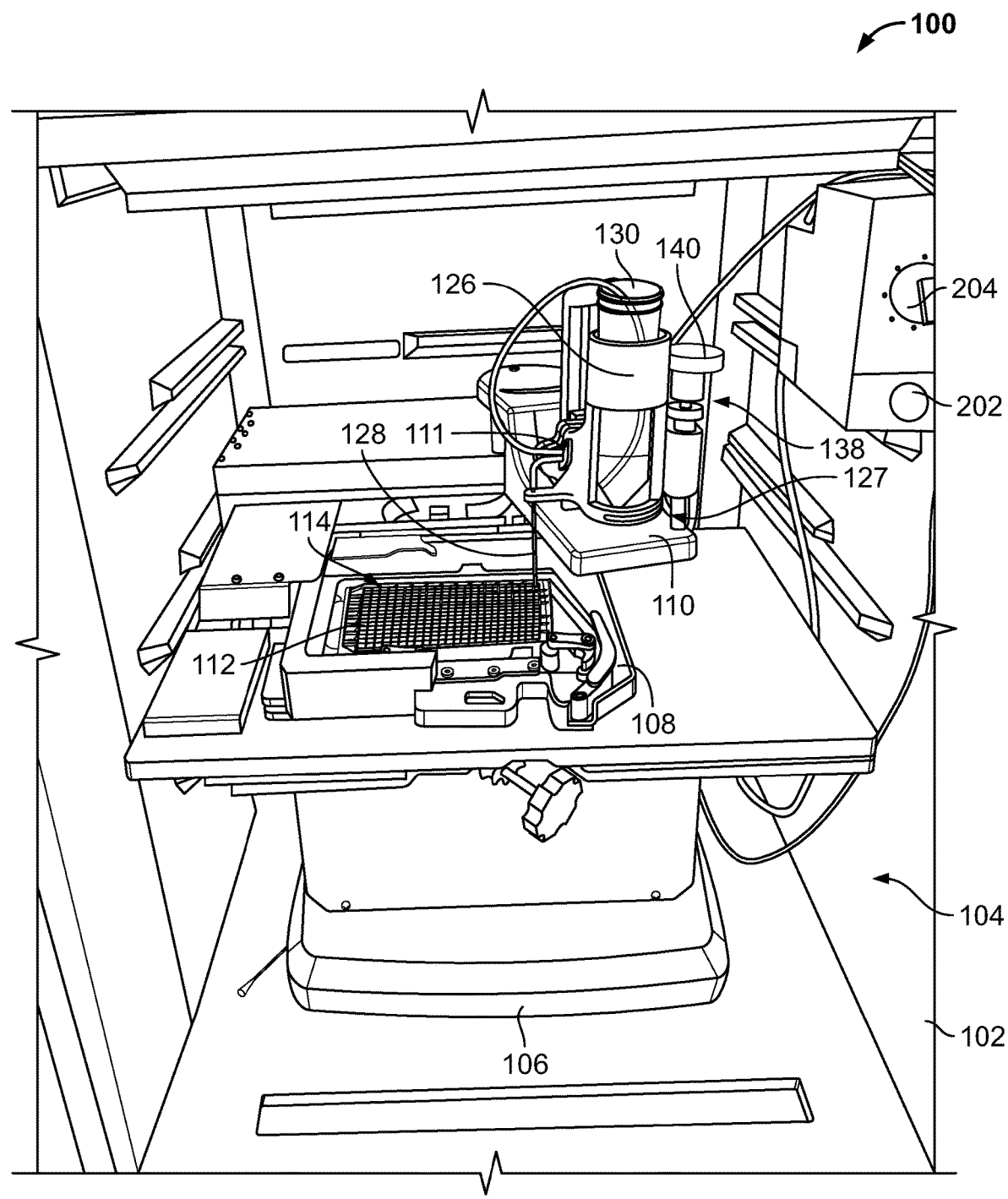
FIG. 2 illustrates an example implementation of the system of FIG. 1.
Figure 3:
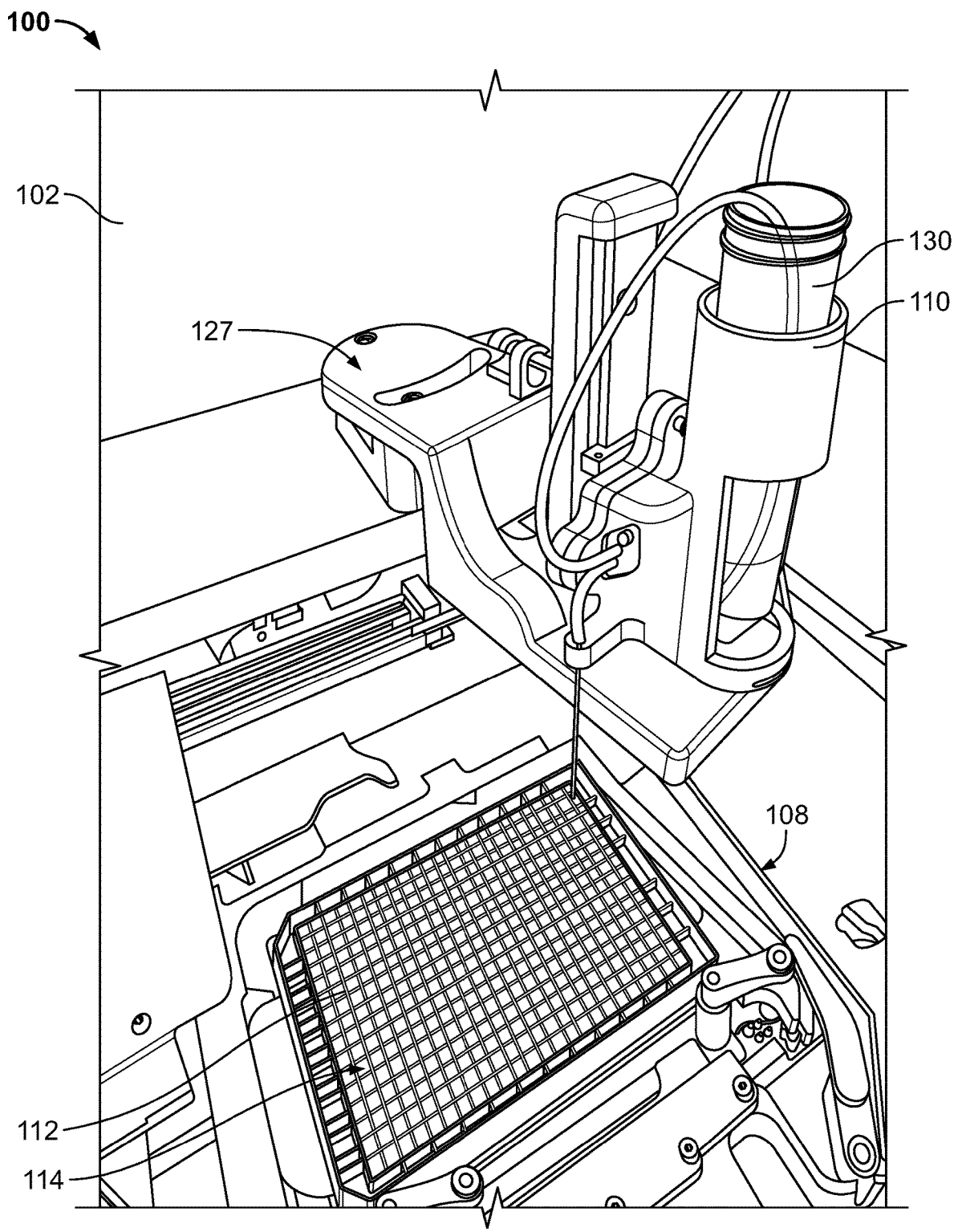
FIG. 3 illustrates a detailed view of the system of FIG. 2.

FIGS. 2 and 3 illustrate an example implementation of the system 100 of FIG. 1. The system 100 includes the enclosure 102 having a temperature control 202. The temperature control 202 includes a rotatable knob 204. The knob 204 can be manually rotated to enable the space 104 to achieve a desired temperature (e.g., between about 4° C. and 10° C.) to perform the assay.

In the example system 100 of FIG. 2, the actuator 108 is a motorized XY microscope stage, the well plate 112 is a 384-well plate and the adjuster 127 of the dispenser 110 includes a threaded adjuster 138 having a handle 140. Additional details of the dispenser 110 are shown and described in connection with FIGS. 5-7 below.

Figure 4:
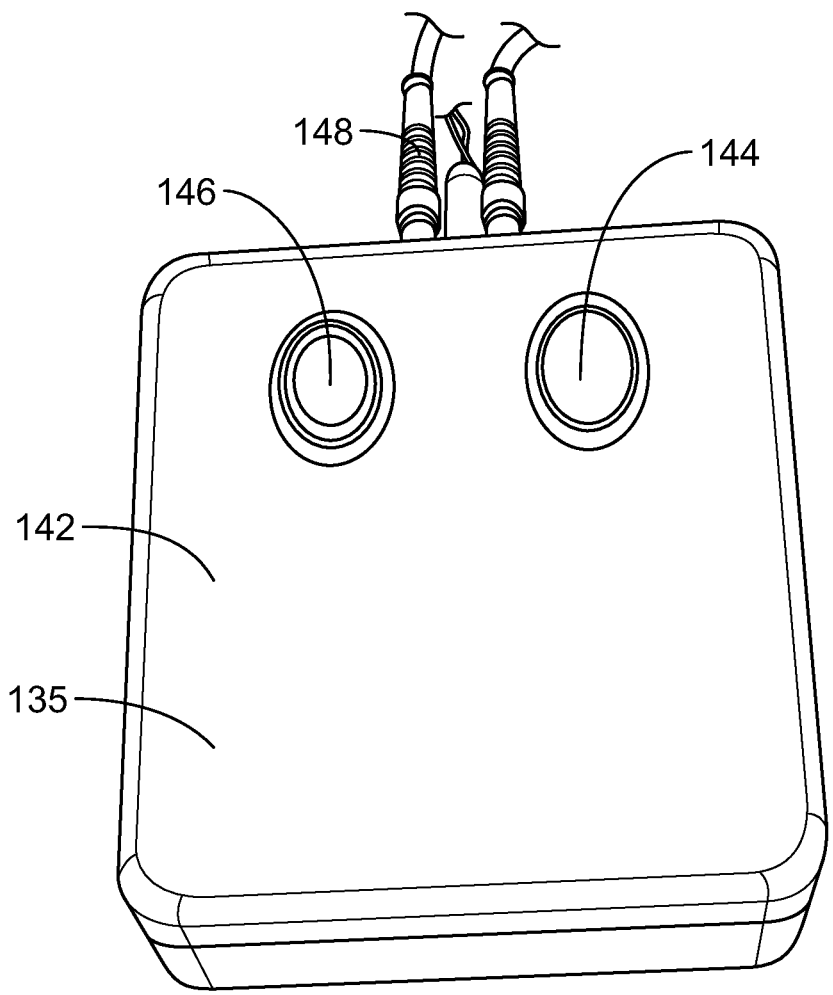
FIG. 4 illustrates an example implementation of the interface of FIG. 1.

FIG. 4 illustrates an example implementation of the interface 135 of FIG. 1. The interface 135 includes a housing 142 and controls (buttons) 144, 146. The controls 144, 146 may be pressed by an operator to initiate, for example, the priming procedure. Wires 148 are coupled to the interface 135 to enable communication with the imaging system 106, the actuator 108, the pump 111 and/or the controller 134.

Figure 5:
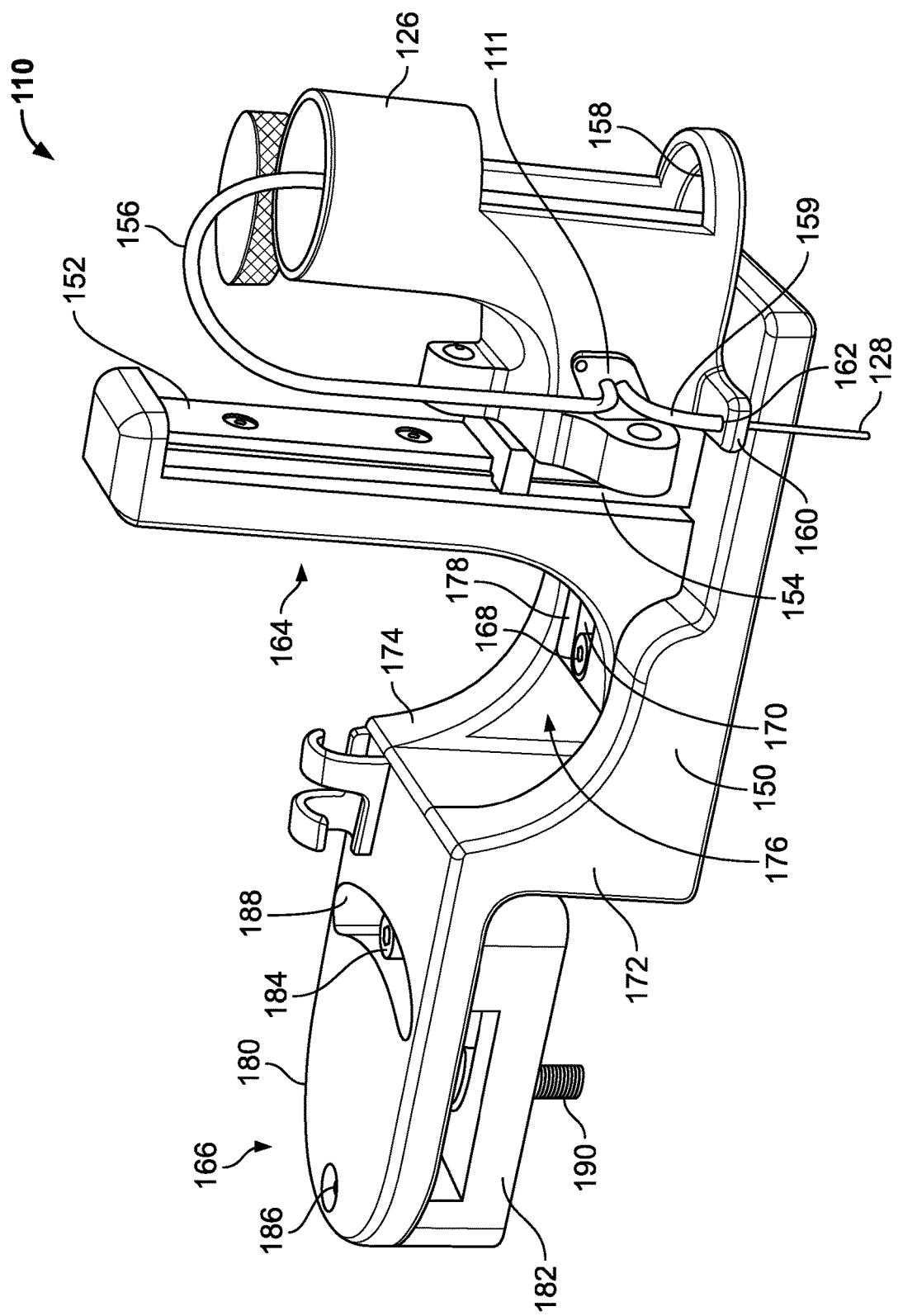
FIGS. 5-7 illustrate different views of the dispenser of FIG. 2.
Figure 6:
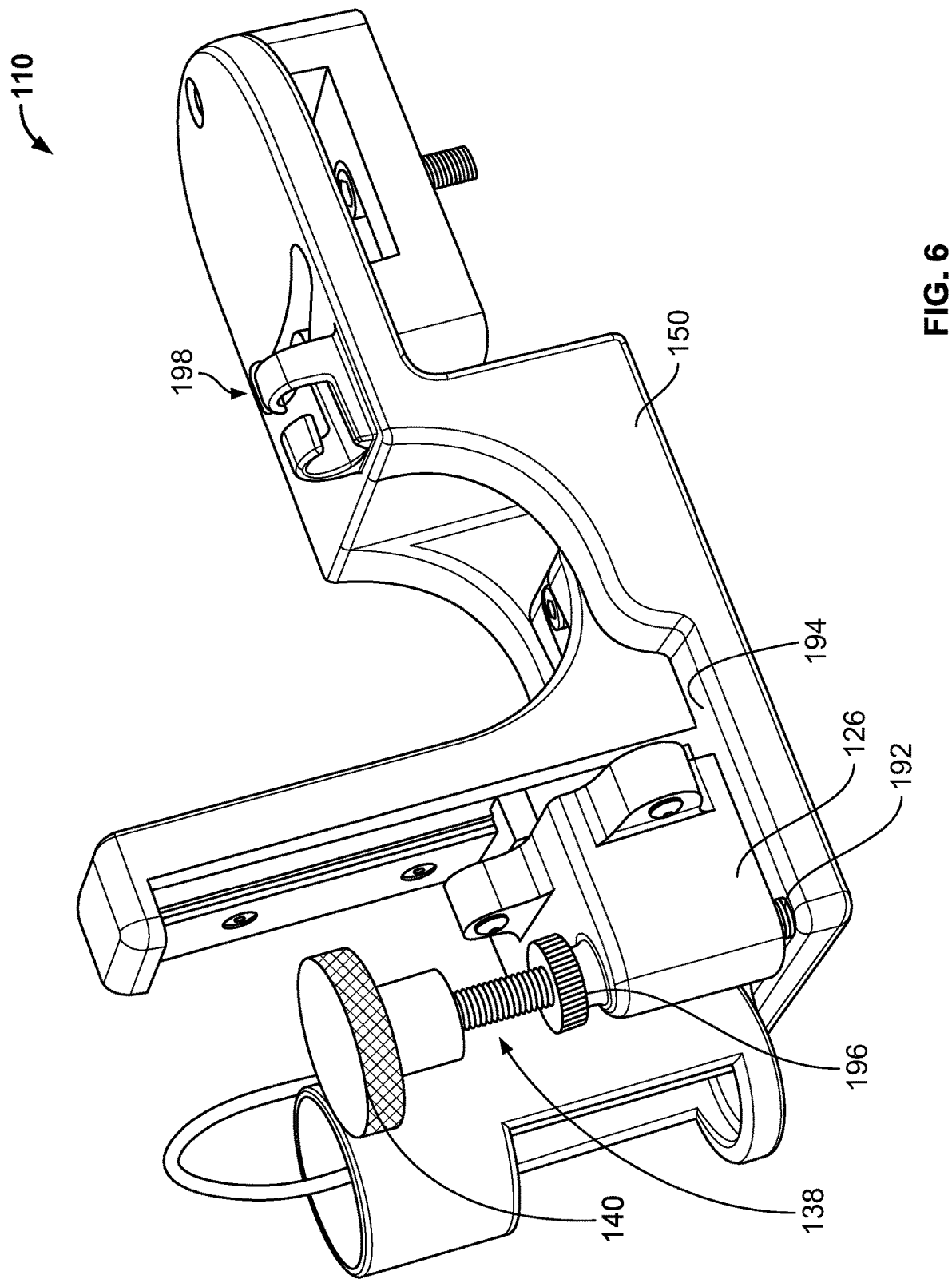
Figure 7:
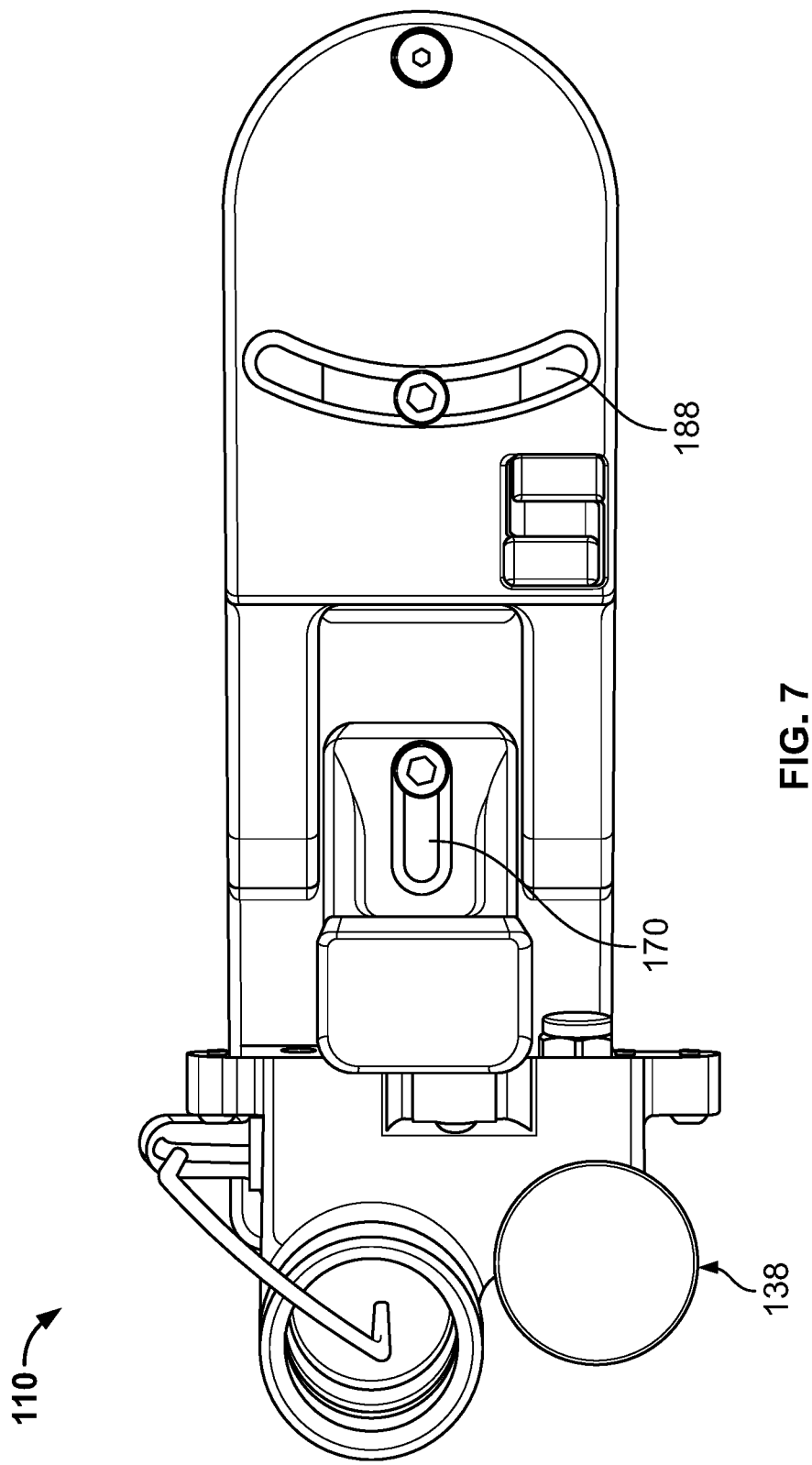

FIGS. 5-7 illustrate different views of the dispenser 110 shown in FIGS. 2 and 3.

Referring to FIG. 5, the dispenser 110 includes a reservoir holder 126 and a base 150. The reservoir holder 126 is movably coupled to the base 150. Specifically, the base 150 carries a rail 152 and the dispenser 110 carries a block 154. The block 154 is received about or otherwise interacts with the rail 152 to linearly guide the reservoir holder 126 relative to the base 150.

The reservoir holder 126 carries the pump 111. First tubing (a source tube) 156 extends from the pump 111 into a receptacle 158 of the reservoir holder 126 and second tubing 159 extends from the pump 111 to the outlet 128. The outlet 128 is implemented by a dispensing tube.

A tab 160 extends from the reservoir holder 126. The tab 160 defines an aperture 162 through which the outlet 128 extends. An interaction between the tab 160 and the outlet 128 secures the outlet 128 relative to the reservoir holder 126.

The base 150 includes a first base portion 164 and a second base portion 166. The base portions 164, 166 are movably coupled via a fastener 168. The first base portion 164 includes a slot 170 through which the fastener 168 extends. The slot 170 enables fore-aft adjustment of the first base portion 164 relative to the second base portion 166 and can be used to implement the adjuster 127 of FIG. 1.

The second base portion 166 includes opposing walls 172, 174 that define a channel 176. The channel 176 receives an end 178 of the first base portion 164. An interaction between the walls 172, 174 and the end 178 guide the fore-aft movement of the first base portion 164.

The second base portion 166 also includes a first sub-base portion 180 and a second sub-base portion 182. The sub-base portions 180, 182 are movably coupled via fasteners 184, 186, where the fastener 186 acts as a pivot. The first sub-base portion 180 includes a radial slot 188 through which the fastener 184 extends. The radial slot 188 enables the first sub-base portion 180, the first base portion 180 and the reservoir holder 126 to move radially relative to the second sub-base portion 182 (left/right; XY tip adjustment).

The second sub-base portion 182 can be secured to the imaging system 106. The radial slot 188 can be used to implement the adjuster 127 of FIG. 1. A fastener 190 extends through the second sub-base portion 182. The fastener 190 can be used to couple the dispenser 110 to the imaging system 106.

Referring to FIG. 6, another isometric view of the dispenser 110 is shown. The dispenser 110 includes the threaded adjuster 138 having the handle 140 and an end 192. The threaded adjuster 138 extends through the reservoir holder 126 and the end 192 is driven against a surface 194 of the base 150. An interaction between the end 192 and the surface 194 adjusts the relative position of the reservoir holder 126 and the base 150 (e.g., height adjustment). Thus, the threaded adjuster 138 can be used to implement the adjuster 127 of FIG. 1.

A lock nut 196 surrounds the threaded adjuster 138. The lock nut 196 is tightened against the reservoir holder 126 after the end 192 of the threaded adjuster 138 is driven against the surface 194 of the base 150. An interaction between the lock nut 196 and the threaded adjuster 138 and the reservoir holder 126 secures the reservoir holder 126 in place. FIG. 6 also shows the base 150 including cable retention clips 198. The retention clips 198 can be used to control cables of, for example, the pump 111.

Referring to FIG. 7, a top view of the dispenser 110 is shown illustrating the threaded adjuster 138 and the slots 170, 188 of the adjuster 127.

Figure 8:
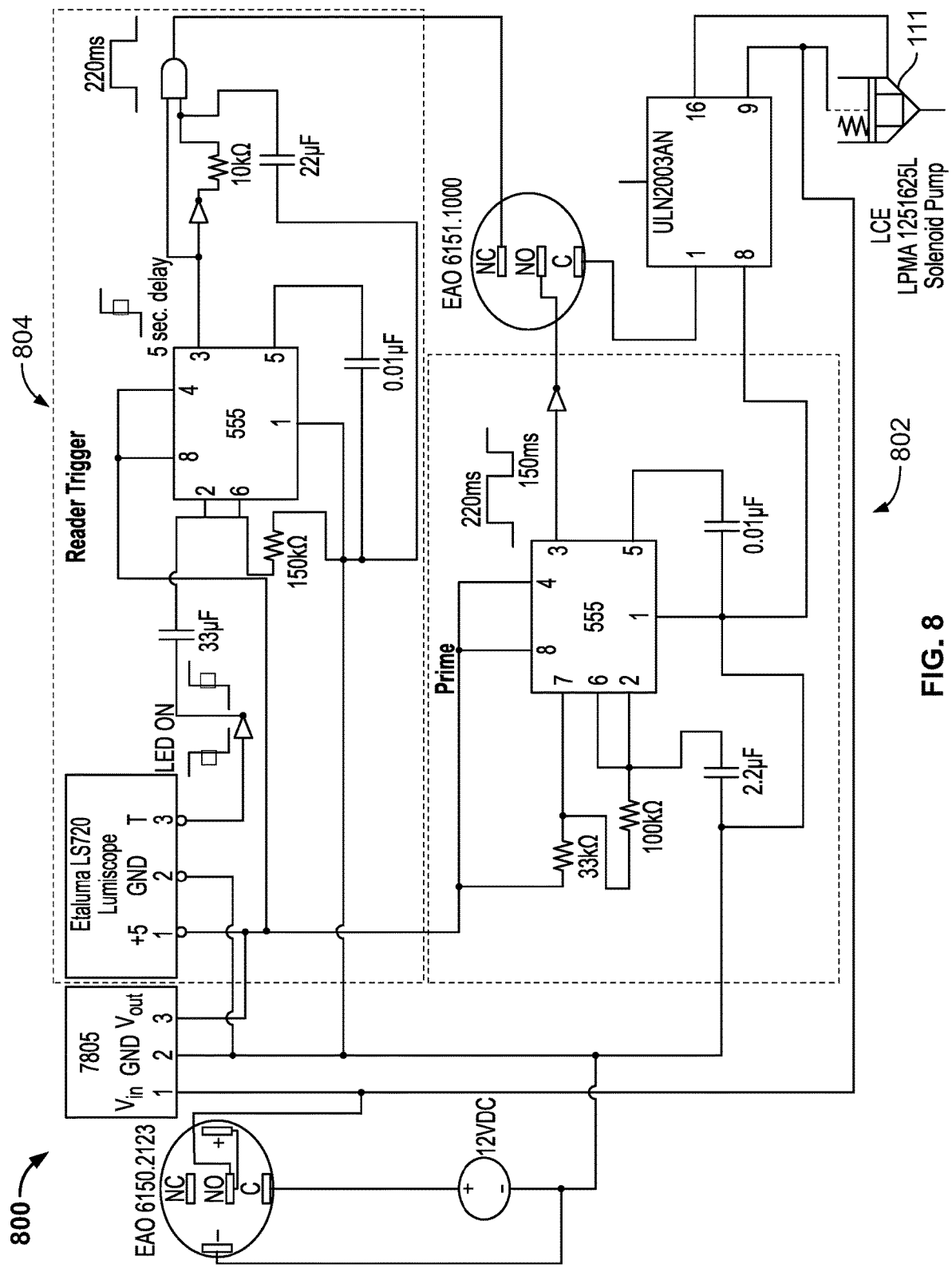
FIG. 8 illustrates a schematic diagram of a circuit that can be used to implement the controller of FIG. 1.

Referring to FIG. 8, a schematic diagram of a circuit 800 that might be used to try and implement the controller 134 of FIG. 1 is shown. The circuit 800 includes a first portion 802 associated with the priming procedure of the pump 111 and a second portion 804 associated with the signal (the trigger) generated by the imaging system 106. The circuit 800 includes integrated circuits in the form of 555 timer chips and logic gate chips that receive an input from the imaging system 106. Specifically, the chips are arranged to receive a signal (a transistor-transistor logic (TTL) signal) from the imaging system 106. The signal may be generated when a light of the imaging system 106 turns on. In response to the signal received, the circuit 800 is configured to turn the pump 111 on to dispense the compound 132 after a threshold amount of time has lapsed.

Figure 9:
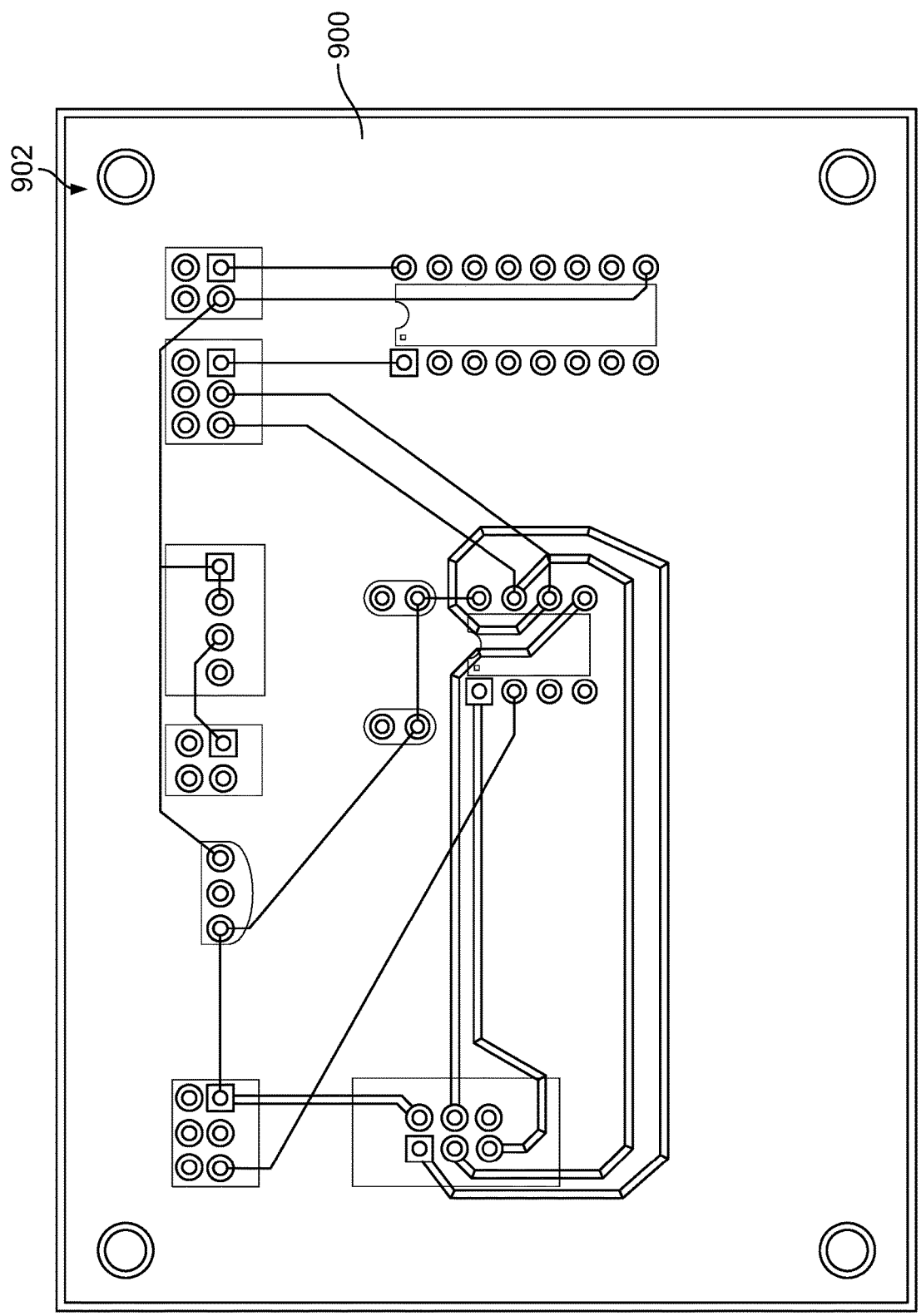
FIG. 9 illustrates a printed circuit board including a circuit that can be used to implement the circuit of FIG. 8 and the controller of FIG. 1.

FIG. 9 illustrates a printed circuit board (PCB) 900 including a circuit 902 that can be used to implement the circuit 800 of FIG. 8 and can be used to implement the controller 134 of FIG. 1. The PCB 900 includes a microcontroller that may be implemented by a ATiny25 microcontroller by Microchip Technology Inc. The microcontroller executes software to implement the processes disclosed. The software ware may include µManager by Vale Lab.

Figure 10:
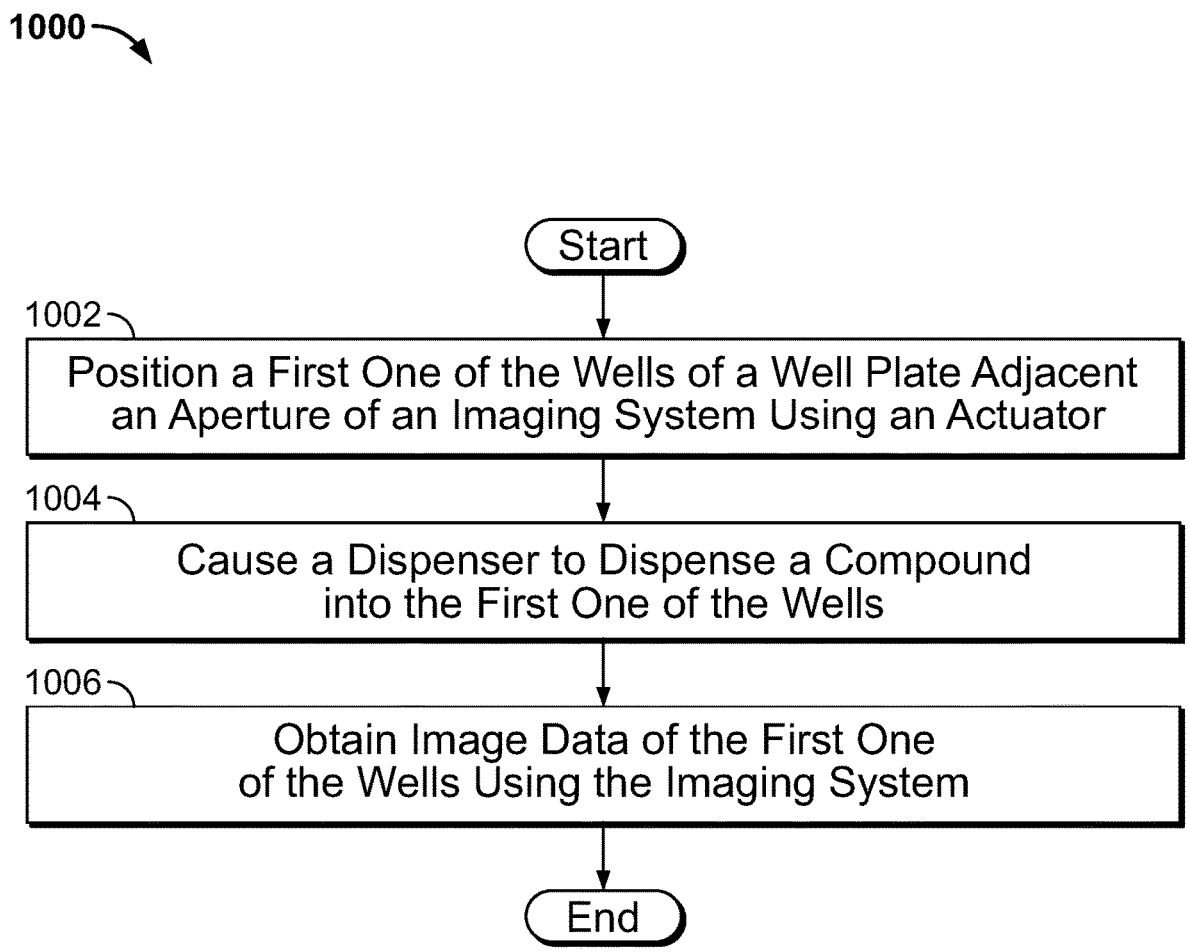
FIG. 10 is a flow chart representative of machine readable instructions that may be executed to implement the system of FIGS. 1-3.

FIG. 10 depicts a flow diagram representing a method 1000 for performing an assay in accordance with the teachings of this disclosure. The method 1000 can be executed by the controller 134 shown in FIG. 1, the circuit 800 shown in FIG. 8, the circuit 902 shown in FIG. 9 and/or or by any other suitable computing device.

At block 1002, the actuator 108 positions the first one 136 of the wells 114 of the well plate 112 adjacent the aperture 124 of the imaging system 106. In response to the first one 136 of the wells 114 being positioned adjacent the aperture 124, the controller 134 causes the dispenser 110 to dispense the compound 132 into the first one 136 of the wells 114. (block 1004). While the dispenser 110 dispenses the compound 132 and/or while a kinetic reaction is taking place, the imaging system 106 obtains image data of the first one 136 of the wells 114. (block 1006). After the image data is obtained, the actuator 108 moves a second one of the wells 114 adjacent the aperture 124. In response to the second one of the wells 114 being positioned adjacent the aperture 124, the imaging system 106 provides a signal to the controller 134 and the controller 134 causes the dispenser 110 to dispense the compound 132 into the second one of the wells 114. While the dispenser 110 dispenses the compound 132 and/or while the kinetic reaction takes place, the imaging system 106 obtains second image data of the second one of the wells.

The examples disclosed herein relate to systems for automated cold enclosure assay having a compact/smaller footprint that enables minimal facility modification and/or room modifications (if any). Additionally, the cost of these systems is significantly less as compared to some known cold-room assay (e.g., approximately ⅓ of the cost).

The example systems can include an enclosure having a temperature controlled space, an imaging system including a microscope, a stage that receives a well plate and a dispenser (a pump mounting system). The temperature-controlled space can be implemented by a minifridge and the microscope can include florescence detection capabilities. The stage can be implemented by a motorized XY microscope stage and the well plate may be a 384-well optical bottom plate.

The dispenser can include a reservoir holder, a dispensing head (an injector), a solenoid pump (e.g., 12 V, 25 µL solenoid pump) and an adjuster. The adjuster may be a manual adjuster that enables an outlet of the dispenser to be adjusted in the x-direction, the y-direction, the z-direction and/or radially. The reservoir holder can be sized to hold a 50 milliliter (mL) tube for compound storage. However, the reservoir holder can be differently sized to hold a different size container.

To enable operator control of the system, a controller is included. The controller includes an interface that may be positioned outside of the enclosure while being electrically coupled to components housed within the enclosure. The controller can control the timing of the dispensing of the compound (e.g., liquid) from the dispensing head and the imaging by the imaging system.

In practice, the system can be used to condense a ZnT8 proteoliposome assay, where the assay is performed between 4° C. and 10° C. and the assay data collection is kinetic. However, other assays can be condensed at the same or different temperatures. To initiate a procedure, a user primes the pump using the interface of the controller. During the priming procedure, the pump can continuously dispense a compound of interest in designated increments into an empty container (e.g., an empty 50 mL tube). Using the adjuster of the dispenser, the user can align (center) the outlet of the dispenser with a first one of the wells and can confirm, using feedback from the stage, that the compound was dispensed into the first one of the wells and not into another one of the wells positioned above, below, to the left or to the right of the intended well. After calibrating the position of the outlet over the first one of the wells, subsequent movement of the well plate by the stage should result in the outlet of the dispenser being positioned in the center of the respective well.

When performing an assay, the dispenser controllably dispenses the compound in the well to enable image data of the kinetic reaction to be captured by the imaging system. After the analysis is performed on one of the wells, the stage moves the well plate to position another one of the wells in alignment with the dispenser and the imaging system. Once aligned, the compound can be dispensed into the corresponding well using the single-dispensing head (pipette) of the dispenser and the imaging system again obtains high-quality image data of the kinetic reaction.

Further, while several examples have been disclosed herein, any features from any examples may be combined with or replaced by other features from other examples. Moreover, while several examples have been disclosed herein, changes may be made to the disclosed examples without departing from the scope of the claims.

What is claimed is:

1. A system for performing an assay, comprising:
an enclosure defining a temperature-controlled space;
an imaging system disposed within the space;
an actuator disposed within the space, the actuator to receive a well plate having wells, the actuator to move the well plate relative to the imaging system to enable the imaging system to obtain image data of one of the wells, wherein the imaging system is positioned underneath the actuator;
a dispenser disposed within the space, the dispenser comprising:
a reservoir holder to receive a reservoir containing a compound, the reservoir holder comprising a block;
a pump to be fluidly coupled to the reservoir;
an outlet, the pump to pump the compound from the reservoir through the outlet into one of the wells;
a base comprising a rail, a first base portion, and a second base portion, the reservoir holder movably coupled to the base such that the block of the reservoir holder interacts with the rail to linearly guide the reservoir holder relative to the base;
an adjuster adapted to change a relative position of the outlet and a first one of the wells;
a threaded adjuster that extends through the reservoir holder and includes an end that is driven against a surface of the base to adjust the reservoir holder relative to the base; and
a controller, in response to the imaging system being positioned to obtain image data of the first one of the wells, the controller configured to cause the dispenser to dispense the compound into the first one of the wells while the imaging system obtains the image data;
wherein the first base portion comprises the rail and the second base portion comprises the surface against which the threaded adjuster is driven, the first base portion comprising a slot through which a fastener extends to couple the first base portion and the second base portion, the slot enabling fore-aft adjustment of the first base portion relative to the second base portion.

2. The system of claim 1, wherein the outlet comprises a single-well dispensing pipette.

3. The system of claim 1, wherein the adjuster comprises a manual adjuster.

4. The system of claim 1, wherein the reservoir holder carries the pump.

5. The system of claim 4, wherein the dispenser further comprises a tab that extends from the reservoir holder, the tab defining an aperture through which the outlet extends to secure the outlet relative to the reservoir holder.

6. The system of claim 1, further comprising a lock nut that surrounds the threaded adjuster, the lock nut to be tightened against the reservoir holder to secure a position of the reservoir holder.

7. The system of claim 1, wherein the second base portion comprises opposing walls that defines a channel that receives an end of the first base portion to guide the fore-aft movement of the first base portion.

8. The system of claim 1, wherein the second base portion comprise a first sub-base portion and a second sub-base portion, the first sub-base portion comprises a radial slot through which a fastener extends to couple the first sub-base portion and the second sub-base portion, the radial slot enabling radial adjustment of the first sub-base portion, the first base portion, and the reservoir holder relative to the second sub-base portion.

9. The system of claim 8, wherein the second sub-base portion is coupled to the imaging system via a fastener.

10. The system of claim 1, further comprising at least one of the following (a) to (c):
   (a) the space is approximately or less than 4.5 cubic feet,
   (b) the imaging system comprises a microscope, or
   (c) the actuator comprises a motorized XY microscope stage.

* * * * *